(12) United States Patent
Marti et al.

(10) Patent No.: US 11,343,599 B2
(45) Date of Patent: *May 24, 2022

(54) SYSTEM AND METHOD FOR TOPOLOGY DISCOVERY AND FIBER CONTINUITY VERIFICATION IN NETWORK

(71) Applicant: Xieon Networks S.à.r.l., Luxembourg (LU)

(72) Inventors: Michael Marti, Lisbon (PT); Rafael da Costa Miranda, Lisbon (PT); Nuno Miguel Pires da Costa Pereira, Amadora (PT)

(73) Assignee: XIEON NETWORKS S.a.r.l., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 17/181,903

(22) Filed: Feb. 22, 2021

(65) Prior Publication Data

US 2021/0204042 A1 Jul. 1, 2021

Related U.S. Application Data

(63) Continuation of application No. 16/730,396, filed on Dec. 30, 2019, now Pat. No. 10,932,019.

(51) Int. Cl.
*H04B 10/07* (2013.01)
*H04Q 11/00* (2006.01)
(Continued)

(52) U.S. Cl.
CPC ...... *H04Q 11/0067* (2013.01); *H04J 14/0227* (2013.01); *H04L 1/0061* (2013.01);
(Continued)

(58) Field of Classification Search
None
See application file for complete search history.

(56) References Cited

U.S. PATENT DOCUMENTS 6,920,287 B1 * 7/2005 Hinds ............... H04B 10/0771
370/241
7,110,670 B1 * 9/2006 Au .................... H04Q 11/0005
398/48
(Continued)

*Primary Examiner* — Jai M Lee

(57) ABSTRACT

An optical network includes an arrangement of optical nodes. An optical node of the arrangement, and corresponding method, perform optical connectivity discovery and negotiation-less optical fiber continuity verification in the optical network. An overall topology of optical connectivity provisioned for the arrangement is discovered by the optical node based on messages received from a management network communicatively coupling the optical nodes to each other. The optical node synchronizes, temporally and sequentially, with the other optical nodes based on the messages received, assigns fiber of the overall topology, based on a verification sequencing method, to verification slots of a verification sequence, and verifies continuity of fiber according to the verification slots of the verification sequence. The discovery, synchronization, and assignment operations enable the optical node and peer node to perform the optical fiber continuity verification in a symmetric, decentralized, and negotiation-less manner.

20 Claims, 11 Drawing Sheets

(51) Int. Cl.
  *H04J 14/02* (2006.01)
  *H04L 1/00* (2006.01)

(52) U.S. Cl.
  CPC ......... *H04Q 11/0005* (2013.01); *H04B 10/07* (2013.01); *H04Q 2011/0045* (2013.01); *H04Q 2011/0079* (2013.01); *H04Q 2011/0083* (2013.01); *H04Q 2011/0088* (2013.01)

(56) References Cited

U.S. PATENT DOCUMENTS

| | | | | |
|---|---|---|---|---|
| 8,687,959 | B2* | 4/2014 | Muppidi | H04J 14/0246 398/30 |
| 9,228,634 | B2* | 1/2016 | McMahon | F16F 15/324 |
| 9,882,634 | B1* | 1/2018 | Al Sayeed | H04L 43/50 |
| 10,009,671 | B2* | 6/2018 | Younce | H04B 10/0791 |
| 10,560,212 | B2* | 2/2020 | Al Sayeed | H04J 14/0272 |
| 10,608,774 | B2* | 3/2020 | Tse | H04J 14/021 |
| 10,771,151 | B2* | 9/2020 | Drake | G02B 6/4467 |
| 10,932,019 | B1* | 2/2021 | Marti | H04J 14/0227 |
| 2002/0102050 | A1* | 8/2002 | Chauvin | H04J 14/0227 385/24 |
| 2003/0113118 | A1* | 6/2003 | Bartur | H04B 10/40 398/139 |
| 2004/0100684 | A1* | 5/2004 | Jones | H04L 41/12 359/337.11 |
| 2006/0221865 | A1* | 10/2006 | Hawbaker | H04L 41/0213 370/255 |
| 2007/0206512 | A1* | 9/2007 | Hinds | H04L 45/46 370/254 |
| 2009/0296719 | A1* | 12/2009 | Maier | H04L 45/123 370/400 |
| 2010/0124176 | A1* | 5/2010 | Fan | H04L 29/12839 370/250 |
| 2010/0275064 | A1* | 10/2010 | DeCusatis | G06F 11/0751 714/37 |
| 2013/0259474 | A1* | 10/2013 | Ji | H04J 14/0204 398/48 |
| 2014/0112658 | A1* | 4/2014 | Hurley | H04J 14/021 398/28 |
| 2015/0208146 | A1* | 7/2015 | Younce | H04J 14/0212 398/21 |
| 2016/0099851 | A1* | 4/2016 | Archambault | H04J 14/0212 398/16 |
| 2017/0346591 | A1* | 11/2017 | Chedore | H04Q 11/0005 |
| 2020/0028765 | A1* | 1/2020 | Schmogrow | H04J 14/0216 |

* cited by examiner

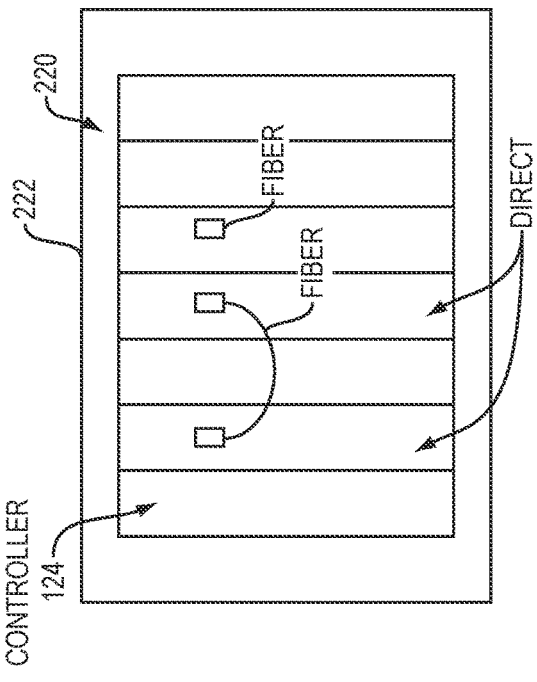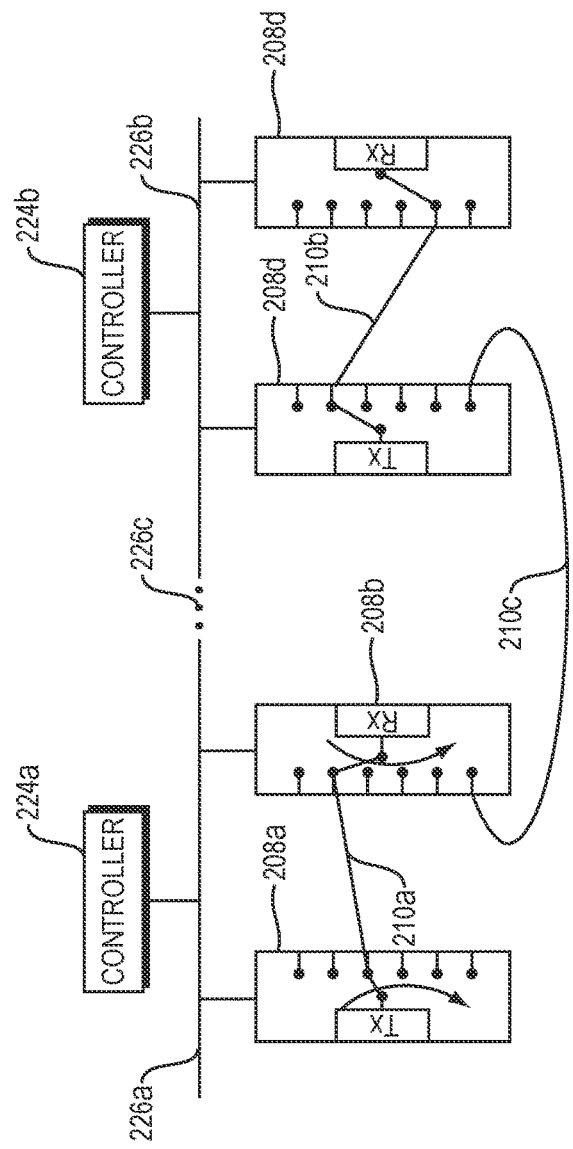

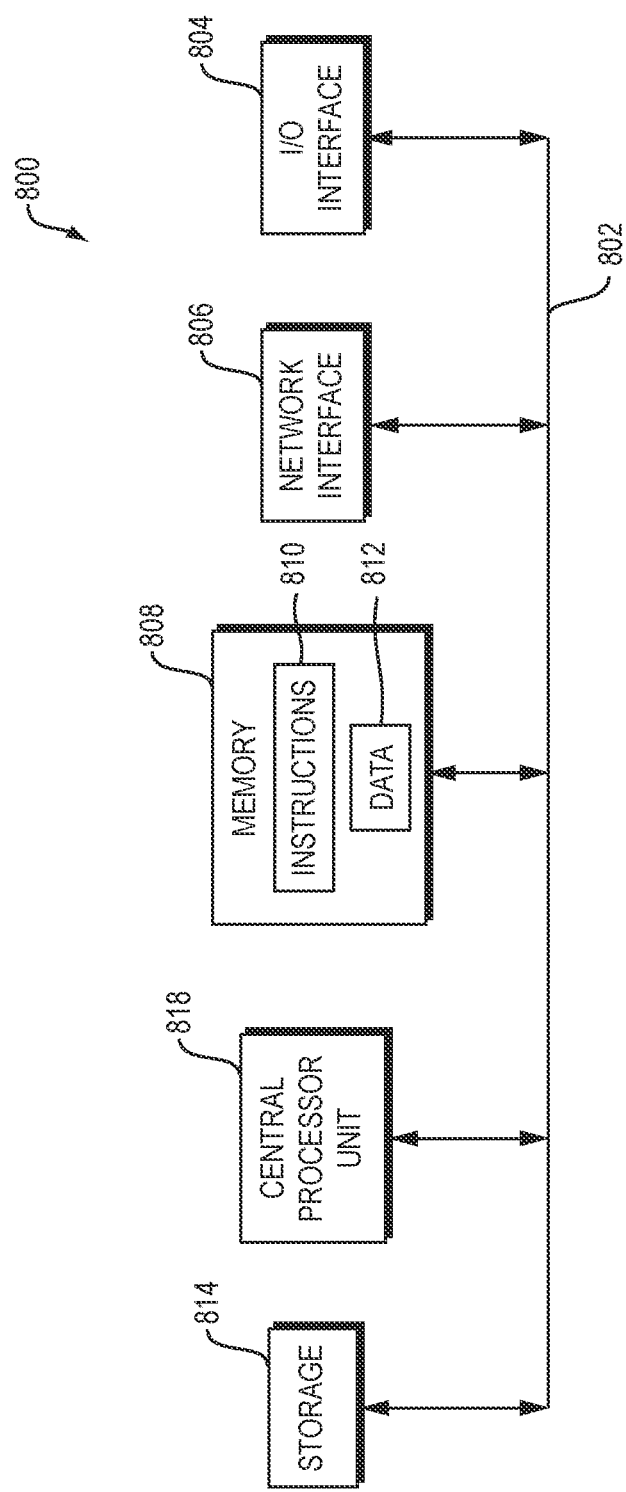

SYSTEM AND METHOD FOR TOPOLOGY DISCOVERY AND FIBER CONTINUITY VERIFICATION IN NETWORK

RELATED APPLICATION

This application is a continuation of U.S. application Ser. No. 16/730,396, filed Dec. 30, 2019. The entire teachings of the above application are incorporated herein by reference.

BACKGROUND

A network is a collection of network elements, such as computers, servers, mainframes, network devices, etc., that connected to one another to allow the sharing of data. There are many types of networks, such as electrical, optical, and radio frequency (RF) types of networks.

An optical network is a type of data communications network built with optical fiber technology. The optical network utilizes optical fiber cables as the primary communication medium for converting data and transport data as light pulses between sender and receiver. An optical network is also known as an optical fiber network, fiber optic network, or photonic network.

The arrangement in which the network elements are connected together in the network denotes the topology of the network. In an optical network, for example, the topology defines the arrangement of the multiple optical fiber cables in the optical network. There are various configurations for the topology of any type of network, such as a bus, ring, star, or mesh topology, etc.

SUMMARY

Embodiments of the present disclosure provide an optical network, optical node, method, and computer program product, that perform optical connectivity topology discovery and negotiation-less optical fiber continuity verification. According to an example embodiment, a method for performing topology discovery and negotiation-less optical fiber continuity verification in an optical network comprises announcing, via a management network, a local topology (e.g., direct neighbors) of optical connectivity provisioned for a given optical node and status information associated with a verification sequence to optical nodes within an arrangement of optical nodes of the optical network. The optical nodes within the arrangement are communicatively coupled via the management network.

The arrangement includes the given optical node and at least one other optical node. The local topology is local only to the given optical node. The method comprises discovering an overall topology, of optical connectivity provisioned for the arrangement, based on the local topology and respective other local topology. The respective other local topology is received from each optical node of the at least one other optical node via the management network.

The method comprises synchronizing with each optical node of the at least one other optical node based on respective other status information. The respective other status information is received from each optical node of the at least one other optical node via the management network and is associated with the verification sequence. The method comprises assigning fiber cables of the overall topology discovered to verification slots (e.g., steps) of the verification sequence. The assigning is based on a verification sequencing method. The verification sequencing method is a same verification sequencing method employed at each optical node within the arrangement.

The method comprises verifying continuity of a given fiber cable according to a given verification slot (e.g., step) of the verification sequence, autonomously and (a) absent negotiation between respective controllers of the given optical node and a peer optical node of the at least one other optical node and (b) absent negotiation between the given and peer optical nodes. The given fiber cable is (i) coupled, in the overall topology, to a given optical port of the at least one optical port and to a peer optical port of the peer optical node and (ii) assigned to the given verification slot based on the verification sequencing method. The respective controllers may be the same controller or distinct controllers.

Another example embodiment disclosed herein includes an optical node corresponding to operations consistent with the method embodiments disclosed herein.

Another example embodiment disclosed herein includes an optical network corresponding to operations consistent with the method embodiments disclosed herein.

Further, yet another example embodiment includes a non-transitory computer-readable medium having stored thereon a sequence of instructions which, when loaded and executed by a processor, causes the processor to perform methods disclosed herein.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 2A is a block diagram of an example embodiment of two optical nodes in which an example embodiment of the present disclosure may be implemented.

FIG. 2B is front view of an example embodiment of a set of optical nodes in a chassis in which an example embodiment of the present disclosure may be implemented.

FIG. 2C is a block diagram of an example embodiment of four optical nodes within which an example embodiment of the present disclosure may be implemented.

FIG. 8 is a block diagram of an example internal structure of a computer optionally within an embodiment disclosed herein.

DETAILED DESCRIPTION

A description of example embodiments follows.

It should be understood that the term "node" and its direct neighbor (i.e., peer node) as used herein may or may not be geographically co-located. A node may refer to a single communications module (e.g., card, pluggable component, field replaceable unit (FRU), etc.), such as any of the individual communications modules installed in the chassis 222 disclosed further below with reference to FIG. 2B. Alternatively, a node may refer to all of the communications modules installed within the chassis 222 of FIG. 2B. It should be understood, however, that nodes themselves need not be geographically co-located. A node as disclosed herein corresponds to one single entity in a layer where a verification sequencing method is applied. The layer can be the geographical interconnect, in which case the node corresponds to one geographical location. The layer can, however, be subcomponents all co-located at a same geographical location, in which case the node corresponds to a single subcomponent. A node may be referred to herein as an apparatus, card, network element, component, line card, blade, data center, etc. A node, as disclosed herein, is associated with a unique identifier (ID) and at least one port configured to transmit, receive, or transmit and receive, payload data (e.g., payload traffic from user packets), as opposed to management data (e.g., management traffic) from a controller. While nodes may be referred to herein as being optical nodes coupled to fiber and employed in optical networks, it should be noted that the present disclosure is not limited to optical nodes, fiber connections, or optical networks. Any type of node, connection, or network may be employed. For example, electrical connections or radio point to point connections fall within the scope of the present disclosure. As such, an "optical network" may be referred to herein as a "network," an "optical node" may be referred to herein as a "node," and a "fiber" or "fiber cable" may be referred to herein as a "connection." As such, an "optical port" may be referred to herein as a "port," etc.

In an optical network, such as the optical network 100 of FIG. 1, disclosed further below, it is useful to verify optical fibers coupling optical nodes, automatically, without human intervention. Such optical nodes may be any type of optical communications module, such as a reconfigurable optical add-drop multiplexer (ROADM) type module, colorless/directionless (CD) add/drop type modules, colorless/directionless/contentionless (CDC) add/drop type modules, splitter/combiner type modules, or any other type of optical communications module with optical port(s) for connecting optical fiber(s) for optical communications.

Figure 1:
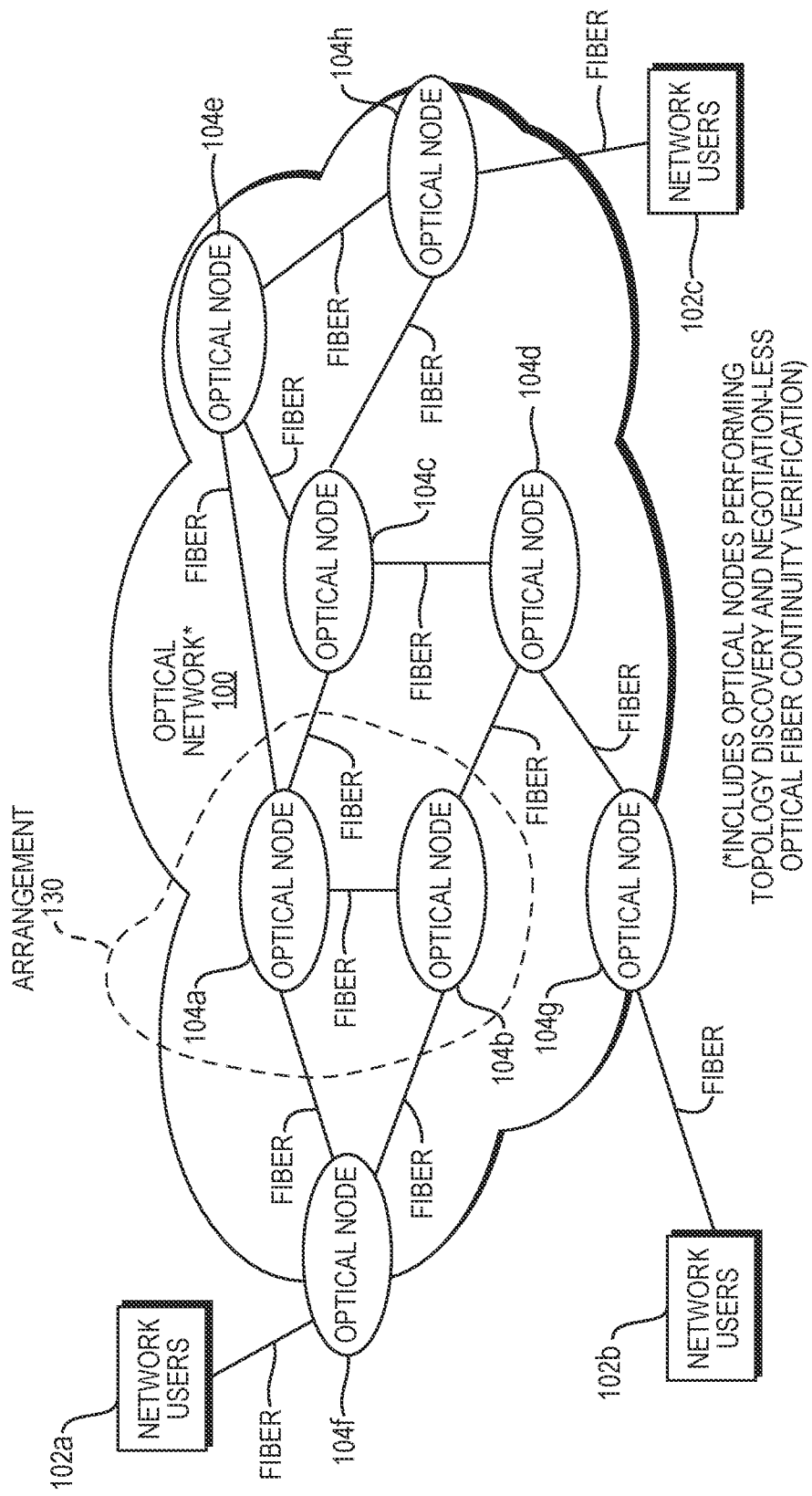
FIG. 1 is a schematic diagram of an example embodiment of an optical network that includes optical nodes performing topology discovery and negotiation-less optical fiber continuity verification.

FIG. 1 is a schematic diagram of an example embodiment of an optical network 100 that includes optical nodes performing topology discovery and negotiation-less optical fiber continuity verification. The optical network 100 may include any number of optical nodes and is not limited to the number of optical nodes of FIG. 1. Further, the optical network 100 may have any suitable network topology, including but not limited to a point-to-point network topology, star network topology, mesh network topology, tree network topology, or other type of network topology.

The optical network 100 may also be referred to interchangeably herein as an optical communications network and may allow a large group of widely-distributed users to inter-communicate with each other, such as the network users 102a, 102b, and 102c. In the optical network 100, optical nodes may be connected directly to such network users, such as the optical nodes 104f-h.

In the optical network 100, the optical nodes 104a-h employ optical fiber, referred to simply as "fiber" herein, for transmitting payload data. Such payload data may originate from network users and be transported throughout the optical network 100 via the optical nodes 104a-h. According to an example embodiment, fiber in the optical network can be verified between nodes if management networks for the nodes are interconnected for message delivery, such as disclosed below with reference to FIG. 2C. Referring back to FIG. 1, the optical nodes may send and receive payload data via the fiber by selecting wavelengths used for optically transporting the payload data. The optical nodes may send and receive cable verification information via the fiber by selecting other wavelength(s) to transport such verification information. The other wavelength(s) used for transporting the cable verification information are different from the wavelengths used for transporting payload data. The cable verification information may be generated using any method known in the art for verifying presence and integrity of the fiber, which is a physical fiber and may also be referred to interchangeably herein as a fiber "cable." Information exchanged to perform such verification may be any suitable information, such as power measurement information or other information that can be exchanged to determine physical continuity of fiber. According to an example embodiment, optical nodes may share a chassis, such as the chassis 222 of FIG. 2B, disclosed further below.

An optical port of such an optical node may be coupled directly to another optical port of the optical node or to a different optical node via a fiber cable. A pair of optical nodes coupled directly by a fiber cable may be referred to herein as "direct" neighbors, that is, one node of the pair is a direct neighbor to the other node of the pair. The fiber cable that couples the pair of optical nodes, directly, may be referred to herein as a "direct" fiber cable. The direct fiber cable has respective endpoints that are connected to respective optical ports of the pair of optical nodes. While such respective optical ports may be provisioned to be coupled in the overall topology of the optical network 100, it is possible that the fiber cable therebetween is not physically present or is faulty. Further, it may be that the respective optical ports are connected to fiber cables that are connected to other optical ports that are different from those or the overall topology. As such, it is useful to verify continuity of the fiber cable in an automated manner in order to, for example, provide a fault notification or alarm when the fiber cable is not physically present or is faulty. The fault notification or alarm may be provided, for example, via a user interface to a network operator(s) of the optical node.

An example embodiment includes a method for topology discovery in network. By announcing their own, and collecting distant, partial topology information, optical nodes in the optical network 100 gain awareness of the total connectivity topology, which is subsequently used for intelligent, symmetric, decentralized, and negotiation-less synchronization of optical fiber continuity verification.

An example embodiment includes a method for negotiation-less fiber continuity verification in the optical network 100. Negotiation-less synchronization of fiber continuity verification is achieved by deploying an announcement and discovery messaging system, running over a management network (not shown), which may be an electrical management network. This messaging system forms a logical mesh between the optical nodes in the optical network 100, while posing little requirements to the physical structure and to the management hierarchy. According to an example embodiment, messages (not shown) originating from optical nodes of the optical network 100 include partial topology information, local to each optical node, and sequence numbering, used for temporal synchronization and data integrity verification.

By simply listening to incoming messages from any optical node in the system, each optical node can, autonomously, gain awareness of the overall optical connectivity topology and can achieve temporal synchronization with the other optical nodes in the optical network 100. The resulting overall topology now individually known to each optical node, and the resulting temporal synchronism then form the basis for the synchronization of the entities participating in the fiber continuity verification. According to an example embodiment, virtually any verification sequencing method can be deployed without the need for further communication or arbitration, as each optical node applies the same verification sequencing method, disclosed further below, over the consistent topology data, that is, the overall topology that is discovered.

In particular, an example embodiment addresses the optical fiber continuity verification between multi-port optical nodes, that must be synchronized between both ends whenever the number of ports a optical node can verify simultaneously is restricted, such as disclosed further below with regard to FIG. 2A. This synchronization requires that the aggregate topology of the optical connections amongst optical nodes be considered. According to an example embodiment, fiber continuity verification is decentralized, symmetric, negotiation-less, and free of any arbitration method and, therefore, addresses scalability, robustness, and performance issues.

FIG. 2A is a block diagram of an example embodiment of two optical nodes, namely a first optical node 208a and second optical node 208b, that are coupled by a fiber cable 210a. The first optical node 208a and second optical node 208b each include at least one optical port. For example, the first optical node 208a includes a first plurality of optical ports 212a and the second optical node 208b includes a second plurality of optical ports 212b. It should be understood that the first optical node 208a and second optical node 208b may be optical nodes of a same or different type. Further, it should be understood that a respective total number of optical ports shown to be included by the first optical node 208a and second optical node 208b may be the same or different and is not limited to the respective total number shown. In the example embodiment, a third optical port 211a of the first optical node 208a is coupled to a second optical port 211b of the second optical node 208b via the fiber cable 210a. The first optical node 208a and second optical node 208b may be employed in a same or different chassis, such as the chassis 222, disclosed below with reference to FIG. 2B.

FIG. 2B is a front view of an example embodiment of a set of optical nodes 220 in a chassis 222 in which an example embodiment of the present disclosure may be implemented. The set of optical nodes 220 includes a plurality of optical nodes that each include optical ports, some of which are coupled to fiber cables as shown. The optical nodes of the set of optical nodes 220 are manufactured as printed circuit boards (PCBs) that are inserted into the chassis 222 and coupled to a backplane (not shown) of the chassis 222. For example, the PCBs may include respective connector(s) that mate with connectors(s) located on the backplane.

The set of optical nodes 220 may include a controller 124 that may be configured to communicate over a management network (not shown) via the backplane with other optical nodes in the set. The management network may be an electrical network that allows for inter-node communication among the optical nodes of the set and may be implemented via traces (not shown) of the backplane that may also be implemented as a PCB. The management network may be communicatively coupled to other management networks, thereby communicatively coupling the set of optical nodes 220 to other optical nodes of other chassis.

Referring back to FIG. 2A, the first optical node 208a includes a transmitter 214 and, optionally, a receiver (not shown). The second optical node 208b includes a receiver 216 and, optionally, a transmitter (not shown). The transmitter 214 is a shared transmitter that is shared among the first plurality of optical ports 212a. The transmitter multiplexer 263 selects which optical port of the first plurality of optical ports 212a is coupled to the transmitter 214. The receiver 216 is a shared receiver that is shared among the second plurality of optical ports 212b. The receiver multiplexer 265 selects which optical port of the second plurality of optical ports 212b is coupled to the receiver 216. As such, the first optical node 208a and second optical node 208b can only send and receive verification information, also referred to interchangeably herein as cable ID information, a single port at time.

For example, in order to verify continuity of the fiber cable 210a, the first optical node 208a is configured to couple the transmitter 214 to the third optical port 211a and, simultaneously, the second optical node is configured to couple the receiver 216 to the second optical port 211b. To verify all fiber cables coupled to respective optical ports of the first plurality of optical ports 212a and respective optical ports of the second plurality of optical ports 212b, the first optical node 208a and second optical node 208b may verify such fibers by employing a scanning sequence. In the scanning sequence, optical ports of the first plurality of optical ports 212a are coupled, sequentially to the transmitter 214 and optical ports of the second plurality of optical ports 212b are coupled, sequentially to the receiver 216. The respective optical ports for coupling to the transmitter 214 and receiver 216 are chosen such that eventually all possible port pairs from 212a and 212b are verified. Such sequential coupling on a port-by-port basis may be referred to herein as a "sweep."

Fiber continuity verification between a pair of optical ports is a time-consuming process due to optical settling time. As such, it is useful, for example, for fast alarming purposes, not to sweep and to only perform fiber continuity verification for optical port combinations that are known to have a fiber cable provisioned therebetween. If, however, the first optical node 208a and second optical node 208b are to only perform fiber continuity verification for the optical port combination with a provisioned fiber, synchronization is needed to ensure that the participating optical nodes, namely the first optical node 208a and second optical node 208b, couple, simultaneously, the transmitter 214 and receiver 216 to the third optical port 211a and second optical port 211b, respectively.

Such synchronization between the participating optical nodes may be based on a known fibering structure provisioned for the optical network, that is, the topology for optical network. According to an example embodiment, disclosed further below with regard to FIG. 3, such synchronized fiber continuity verification can be performed by the first optical node 208a and second optical node 208b, autonomously, and absent control over same by a controller (s), such as the controllers of FIG. 2C, disclosed below.

FIG. 2C is a block diagram of an example embodiment of four optical nodes within which an example embodiment of the present disclosure may be implemented. The four optical nodes include the first optical node 208a and second optical node 208b, disclosed above with regard to FIG. 2A, and the third optical node 208c and fourth optical node 208d. A fiber cable 210a is interposed between optical ports of the first optical node 208a and second optical node 208b. The first optical node 208a and second optical node 208b are controlled by a first controller 224a. The first controller 224a, first optical node 208a, and second optical node 208b are communicatively coupled via a first management network 226a.

The third optical node 208c and fourth optical node 208d are controlled by a second controller 224b. The second controller 224b, third optical node 208c, and fourth optical node 208d are communicatively coupled via a second management network 226b. A fiber cable 210b is interposed between optical ports of the third optical node 208c and fourth optical node 208d. The second controller 224b, third optical node 208c, and fourth optical node 208d are communicatively coupled via a second management network 226b. A fiber cable 210c is interposed between optical ports of the second optical node 208b and third optical node 208c.

In the example embodiment, a third management network 226c couples the first management network 226a and the second management network 226b enabling the first optical node 208a and second optical node 208b to be communicatively coupled to the third optical node 208c and the fourth optical node 208d and vice versa. For example, the first optical node 208a and second optical node 208b may reside in a chassis, such as the chassis 222 of FIG. 2B, disclosed above, and such chassis may be different from a chassis that houses the third optical node 208c and fourth optical node 208d. As such, the third management network 226c enables the first management network 226a and second management network 226b to appear as a single communication domain.

For example, the first controller 224a and second controller 224b may be coupled, for example, via the Internet and such communicate coupling of the third management network 226c may be achieved via packet forwarding between the first controller 224a and second controller 224b. The purpose of the third management network 226c is not necessarily to connect the controllers but is to allow messages from optical nodes on the first management network 226a to be heard by nodes on second management network 226b and vice versa (i.e., coupling of the management networks 226a and 226b). Such a coupling may however, be achieved by using the controller as a router, with an interconnect between the controllers. The messages sent out by optical nodes are not to be interpreted by the controller. Rather, the controller might simply forward the messages, if the management network topology requires same.

In order to perform optical fiber continuity verification for the fiber cables interposed the optical nodes, the first controller 224a and second controller 224b may negotiate in order to synchronize selection for optical ports to couple to a transmitter or receiver on the optical nodes. As disclosed above with regard to FIG. 2A, the transmitter, receiver, or combination thereof employed by any optical node may be a shared resource.

As such, the first controller 224a and second controller 224b may negotiate, that is, perform a handshake of communications with requests and respective responses to the requests, in order to determine which optical port of the optical nodes is to be coupled to its respective transmitter or receiver at a given time. In response to completion of such negotiation, the first controller 224a and second controller 224b may communicate with the respective optical nodes they control such that the respective optical nodes can configure the negotiated selection and perform continuity verification in a synchronized manner. While such negotiation may mediate for selection that is limited to optical ports provisioned to be coupled to a fiber cable, such negotiation is a centralized coordination method with limitations.

Centralized coordination of selected ports for fast fiber alarming has limitation, such as scaling and single point of failure. Fibering information might be distributed, and not readily available at one single point, and the management network may have a hierarchical structure. As such, coordination traverses several levels.

According to an example embodiment, each optical node has the knowledge of the fibers that are directly connected to it, based on the local configuration data, received from the respective controller through the management network: local topology. Each optical node announces its local topology to the optical nodes on the management network. Such announcing may employ a broadcast message, multicast message, or any other type of message that can be transmitted once and received by any recipient. Optical nodes listen to all announcements and collect the topology information in order to discover an overall topology.

An example embodiment may include a unique identifier (ID) of the sending optical node as well as a unique ID of the message type in transmitted messages and may employ a resend request and response mechanism to guarantee consistency between optical nodes. The unique ID of the message type may be referred to as a message type ID or, simply, as a message ID, that may identify, for example, whether the message includes an announcement message (status and/or topology information) or whether it contains a resend request with a list of node ID(s) for which status and/or topology information is missing. The announcement message may include a field that identifies which sequence number the sending node (i.e., node transmitting the message) is currently at, that is, synchronized to. This sequence number is used to synchronize the nodes in terms of temporal sequence slots of the verification sequence. As such, the message ID may be used as a heartbeat to guarantee temporal synchronization between optical nodes. Sequential synchronization may be achieved based on all optical nodes having the same, consistent overall (i.e., total) topology, and each optical node applying the same verification sequencing method to attribute every fiber of the overall topology to a respective sequence number that is the same respective sequence number at each optical node.

According to an example embodiment, each optical node applies a same verification sequencing method to the overall topology they discover in order to attribute every element (fiber) in the overall topology, deterministically, to a certain verification slot of the heartbeat sequence for verification. Because the verification sequencing method is deterministic and the same across all optical nodes, each optical nodes assigns the same fibers to the same verification slots. Such an example embodiment has advantages. For example, the fiber continuity verification is decentralized, each optical node performs such verification under its own control, that is, autonomously. The only information exchange needed is a heartbeat and topology. No point to point communication is necessary between individual peers. The fiber continuity verification is symmetric, that is, every optical node runs the same method verification sequencing method. The fiber continuity verification is distributed. As such, any optical node can be removed at any time without affecting the operation of the other optical nodes.

It should be understood that the verification sequencing method can be any suitable sequencing method that assigns each fiber of the overall topology, deterministically, to the verification slots of the verification sequence. The verification sequencing method ensures that verification capabilities of each node are not exceeded. For example, if an optical node has a shared transmitter, such as the shared transmitter 214 of FIG. 2A, disclosed above, the verification sequencing method ensures that no verification slot that is verifying fiber to such a node would verify more than one fiber coupled to that node. According to an example embodiment, the verification sequencing method may minimize a total number of verification slots employed to verify all of the fiber in the overall topology while ensure that verification capabilities, such as transmit and receive capabilities, are not exceeded for any optical node in the arrangement. Regardless of what requirements are imposed on the verification sequencing method, the verification sequencing method needs to be deterministic, that is, yield a same output for a same input at any node. For example, the verification sequencing method would yield the same fiber-to-verification-slot mapping at any optical node when applied to the same overall topology.

According to an example embodiment, the verification sequencing method could be described by a set of rules. For example, given a list of node ID pairings {left node ID, right node ID} that identify node endpoints for fibers (a fiber can be represented as a pair of ID's of the peers it connects) in the overall topology:

Switch the left node ID and the right node ID of the fibers in the list such that the node with the lower ID number is on the left Always sweeping the list of fibers from the top (first entry) of the list to the bottom (last entry) of the list, attributing (i.e., assigning) the first unassigned fiber to the lowest sequence number for which the involved nodes are not yet busy.

The above set of rules will lead to the same sequence (deterministic) on all the nodes and may be referred to as a greedy method. It is said to be greedy because it sweeps the list from top to bottom and, as soon as a fiber is found that can be assigned, it is done so, greedily, not considering whether this will lead to an optimal solution.

It should be understood that the verification sequencing method is not limited to a greedy method and can be made to be more complex to find an optimal solution with a least number of verification slots or more elaborate to cater to specific needs. For example, the verification sequencing method could assign more important fibers to multiple verification slots, such that those fibers are verified more frequently relative to other fibers in the overall topology.

Figure 2D:
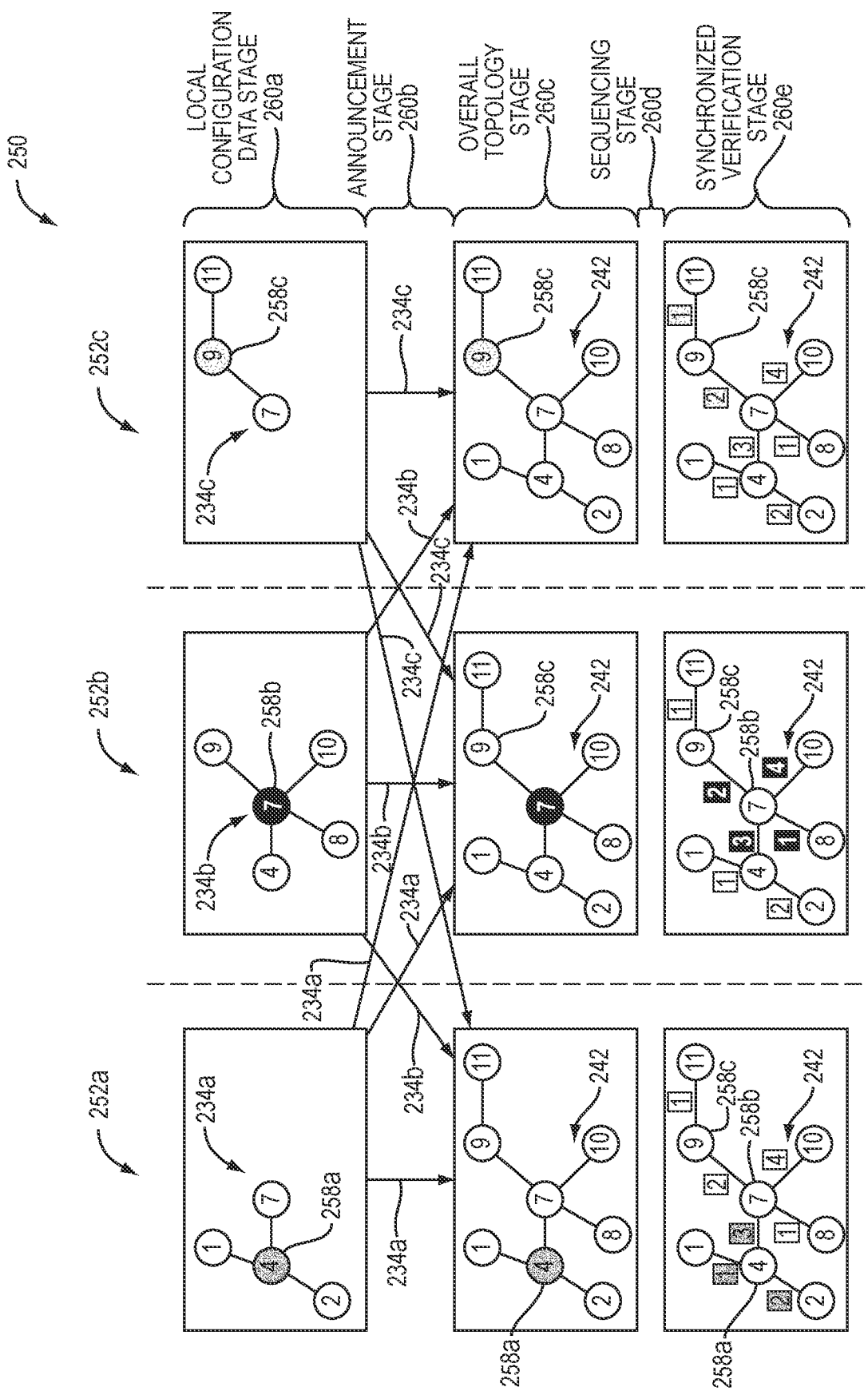
FIG. 2D is an evolution of topology graph diagram of an example embodiment of different stages in the discovery of an overall topology for fiber continuity verification

FIG. 2D is an evolution of topology graph diagram 250 of an example embodiment of different stages in the discovery of an overall topology 242 for fiber continuity verification that may be employed in an optical network, such as the optical network 100 of FIG. 1. The stages include a local configuration data stage 260a, announcement stage 260b, overall topology stage 260c, sequencing stage 260d, and synchronized verification stage 260e. The local configuration data stage 260a and announcement stage 260b enable discovery of the overall topology 242 shown in the overall topology stage 260c.

The evolution of topology graph diagram 250 is segregated into three columns that include a first column 252a, second column 252b, and third column 252c. The first column 252a corresponds to a first optical node 258a with an identifier (ID) of 4, that is "ID 4." The second column 252b corresponds to a second optical node 258b with ID 7. The third column 252c corresponds to a third optical node 258c with ID 9.

In the local configuration data stage 260a, each optical node receives its respective local topology. For example, first optical node 258a receives the first local topology 234a, the second optical node 258b receives the second local topology 234b, and the third optical node 258c receives the third local topology 234c. In the local topologies, each optical node is represented as a circle with its corresponding ID included therein. In the evolution of topology graph diagram 250, lines between circles represent a fiber cable interposed between the optical nodes represented by the circles.

In the announcement stage 260b, each of the optical nodes announces its local topology to all other optical nodes that are communicatively coupled to a management network. In the overall topology stage 260c each optical node has completed discovery of the overall topology 242 by joining its own local topology with that of each respective local topology announced by the other optical nodes in the announcement stage 260b.

In the sequencing stage 260d, each optical node assigns each fiber of the overall topology 242 to a respective verification slot of verification slots of a verification sequence based on a verification sequencing method. The verification sequencing method is the same verification sequencing method for each optical node. Each verification slot may represent a time slot of the verification sequence. Each verification slot may be associated with a sequence number that represents, in time, a cycle of verification. All fiber assigned to the same verification slot in the verification sequence would be verified at a same time. The verification sequencing method may be any method that assigns all of the fiber in the overall topology, deterministically.

Following the sequencing stage 260d, the optical nodes perform synchronized verification in the synchronized verification stage 260e. In the synchronized verification stage 260e, there are four verification slots in the verification sequence assigned the ordinal numbers 1, 2, 3, and 4. In the synchronized stage 260e, fibers in the overall topology 242 are shown as annotated with such ordinal numbers to indicate to which verification slot each fiber has been assigned by the sequencing stage 260d.

In the synchronized verification stage 260e, all optical nodes coupled to a fiber annotated with the ordinal number 1 would verify that fiber in the first verification slot of the verification sequence by turning their verification transmitter and receiver to the respective optical port. All optical nodes coupled to a fiber annotated with the ordinal number 2 would verify that fiber in the second verification slot of the verification sequence. All optical nodes coupled to a fiber annotated with the ordinal number 3 would verify that fiber in the third verification slot of the verification sequence, and all optical nodes coupled to a fiber annotated with the ordinal number 4 would verify that fiber in the fourth verification slot of the verification sequence. It should be understood that the total number of optical nodes, local and overall topologies, fiber to verification slot assignments, etc., are shown for illustrative purpose and example embodiments disclosed herein are not limited thereto.

Referring back to FIG. 1, the optical network 100 comprises an arrangement 130 of at least two optical nodes. The at least two optical nodes includes a first optical node 104a. The first optical node 104a is associated with a first local topology (not shown) of optical connectivity provisioned for the first optical node 104a. The at least two optical nodes includes a second optical node 104b. The second optical node 104b is associated with a second local topology (not shown) of optical connectivity provisioned for the second optical node 104b.

The optical network 100 comprises a management network (not shown). Optical nodes within the arrangement 130 are communicatively coupled to each other via the management network. The management network may be hierarchical. In the optical network 100, the first optical node 104a and second optical node 104b are announcing, via the management network, the first and second local topologies, respectively, and respective status information (not shown) that is associated with a verification sequence (not shown). The first optical node 104a and second optical node 104b are discovering an overall topology of optical connectivity provisioned for the arrangement 130 based on the first and second local topologies. The overall topology may be referred to interchangeably herein as a global topology. The first optical node 104a and second optical node 104b are synchronizing to each other based on the announcing.

The first optical node 104a and second optical node 104b are assigning fiber cables of the overall topology discovered to verification slots (not shown) of the verification sequence. The verification slots may be referred to interchangeably herein as steps. The assigning is based on a verification sequencing method. The verification sequencing method is a same verification sequencing method for both the first optical node 104a and second optical node 104b. A given fiber cable (not shown) in the overall topology is coupling optical ports (not shown) of the first optical node 104a and second optical node 104b. The given fiber cable is assigned to a given verification slot (not shown) of the verification sequence based on the verification sequencing method. The first optical node 104a and second optical node 104b perform synchronized continuity verification of the given fiber cable, autonomously and (a) absent negotiation between respective controllers (not shown) of the first optical node 104a and second optical node 104b and (b) absent negotiation between the first optical node 104a and second optical node 104b, by verifying the given fiber cable according to the given verification slot of the verification sequence. The verification sequence is based on the overall topology discovered, such as disclosed above with regard to FIG. 2D.

Figure 3:
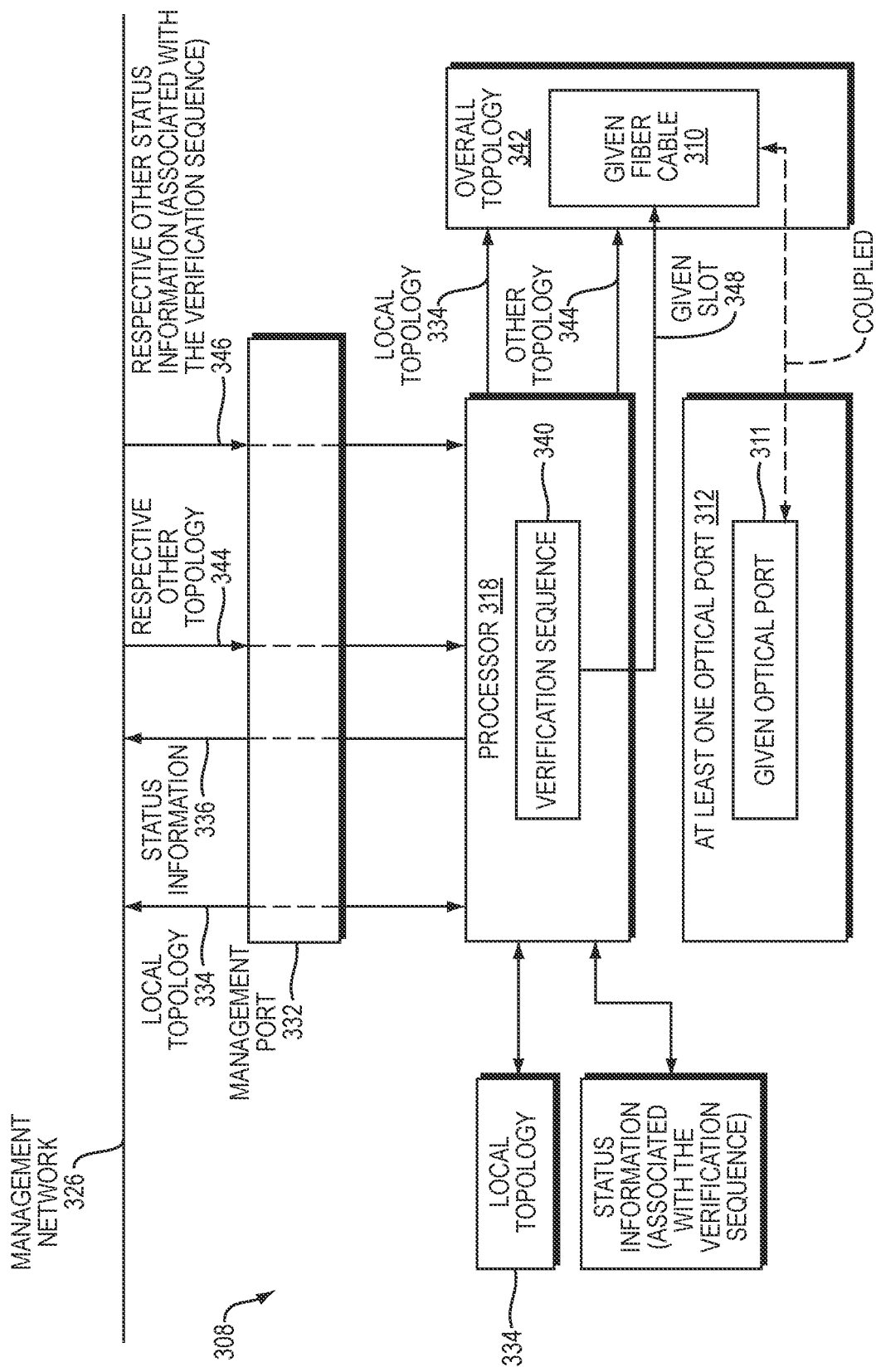
FIG. 3 is a block diagram of an example embodiment of an optical node configured to perform topology discovery and negotiation-less optical fiber continuity verification in an optical network.

FIG. 3 is a block diagram of an example embodiment of an optical node 308 configured to perform topology discovery and negotiation-less optical fiber continuity verification in an optical network, such as the optical network 100 of FIG. 1, disclosed above. The optical node 308 comprises at least one optical port 312 configured to transmit, receive, or transmit and receive, payload data (not shown). The optical node 308 comprises a management port 332 coupled to a management network 326.

Referring to FIG. 1 and FIG. 3, optical nodes within the arrangement 130 are communicatively coupled to each other via the management network 332. The arrangement 130 includes a given optical node, that is, the first optical node 104a, and at least one other optical node, that is, the second optical node 104b. The given optical node includes the optical node 308. The optical node 308 comprises a processor 318.

The processor 318 announces a local topology 334 of optical connectivity provisioned for the optical node 308 and status information 336 associated with a verification sequence 340 to the optical nodes within the arrangement 130 via the management port 332. The processor 318 discovers an overall topology 342, of optical connectivity provisioned for the arrangement 130, based on the local topology 334 and respective other local topology 344 received from each other optical node of the at least one other optical node via the management port 332. The local topology 334 is local only to the optical node 308 and, as such, is the optical node 308's "own" local topology 334. Each respective other local topology 344 is local only to a respective other optical node of the at least one other optical node.

The processor 318 synchronizes with each optical node (i.e., all) of the at least one other optical node based on respective other status information 346 that is received from each optical node of the at least one other optical node via the management port 332. The respective other status information 346 is associated with the verification sequence 340.

The processor 318 assigns fiber cables of the overall topology 342 discovered, based on a verification sequencing method, to verification slots (not shown) of the verification sequence 340. The verification sequencing method is a same verification sequencing method employed at each optical node within the arrangement 130. The processor 318 verifies continuity of a given fiber cable 310 according to a given verification slot 348 (e.g., present verification slot or current verification slot) of the verification sequence 340, autonomously and (a) absent negotiation between respective controllers (not shown) of the given optical node and a peer optical node and (b) absent negotiation between the given and peer optical nodes, such as the second optical node 104b, of the at least one other optical node. The given fiber cable 310 is (i) coupled, in the overall topology 342, to a given optical port 311 of the at least one optical port 312 and to a peer optical port (not shown) of the peer optical node and (ii) assigned by the processor 318 to the given verification slot 348 based on the verification sequencing method.

The optical node 308 is associated with a given controller (not shown) of the respective controllers. The processor 318 is further configured to discover the overall topology 342 by supplementing, for example, by joining or aggregating, the local topology 334 with the respective other local topology 344. For example, the overall topology may be discovered by summing the local topology 334 with each respective other local topology 344 received from each of optical node of the optical nodes in the arrangement. The local topology 334 is received from the given controller via the management port 332. Each respective other local topology 344 is received via a respective announcement message (not shown) that is communicated over the management network 326 by each respective other optical node.

The local topology 334 includes optical connectivity provisioning information for each optical port of the at least one optical port 312 that is provisioned to be coupled to a respective peer optical port via a respective fiber cable in the optical network 100.

According to an example embodiment, the processor 318 is further configured to announce the local topology 334, status information 336, or a combination thereof in a message (not shown) that is transmitted via the management port 332 to the optical nodes in the arrangement 130. The message may be a one-to-many type of message that is transmitted once and received by multiple recipients. According to an example embodiment, the message is a broadcast or multicast message. It should be understood that the one-to-many type of message is not limited to broadcast or multicast type of messages. The message may be referred to interchangeably herein as a heartbeat message.

The status information 336 may include a sequence number. The sequence number may be referred to interchangeably herein as a heartbeat number. The processor 318 may be further configured to include a message type identifier (ID) (not shown) and unique ID (not shown) of the optical node in the message. The message type ID identifies a type of the message. The sequence number identifies a present verification slot of the verification slots of the verification sequence 340 to which the processor 318 is synchronized. The processor 318 may be configured to compute a checksum (not shown) for the message and append the checksum computed to the message. This useful to guarantee consistency of the overall topology between all participating optical nodes.

The processor 318 may be further configured to compute a first checksum (not shown) for a message (not shown) received via the management port 332. The message may include a message type ID and unique ID of the sending optical node of the message and may have a second checksum (not shown) appended thereto. In an event the first checksum computed does not match the second checksum, the processor 318 may discard the message.

The processor 318 may be further configured to verify continuity of the given fiber cable 310 according to the given verification slot 348 of the verification sequence 340 and synchronized with the peer optical node, wherein the peer optical node includes the peer optical port.

The verification sequencing method assigns each fiber cable of the overall topology 342, deterministically, to a respective verification slot in the verification sequence 340. The verification sequencing method is deterministic and, as such, each optical node within the arrangement is caused to assign each fiber cable to a same respective verification slot relative to other optical nodes in the arrangement because all of the optical nodes in the arrangement apply the same verification sequencing method to the overall topology 342 and the overall topology 342 is consistent among all of the optical nodes in the arrangement. As such, all of the optical nodes derive the same verification sequence defines an order for verifying all fiber cables in the overall topology, and which fibers may be verified, in parallel, that is, within a same time slot.

The optical node 308 further comprises a transmitter (not shown), receiver (not shown), or a combination thereof, and a transmitter multiplexer (not shown), receiver multiplexer (not shown), or combination thereof. The processor 318 may be further configured to progress through the verification sequence 340 by transitioning between verification slots (i.e., steps) of the verification sequence 340 based on received status information, that is, the respective other status information 346 that is associated with the verification sequence 340. The received status information is transmitted by each optical node of the at least one other optical node via the management network 326 and received by the processor 318 via the management port 332. In an event the processor 318 transitions to the given verification slot 348, the processor 318 may couple the given optical port 311 to the transmitter, receiver, or combination thereof via the transmitter multiplexer, receiver multiplexer, or combination thereof, and verify continuity of the given fiber cable 310 assigned to the given verification slot 348.

Figure 4:
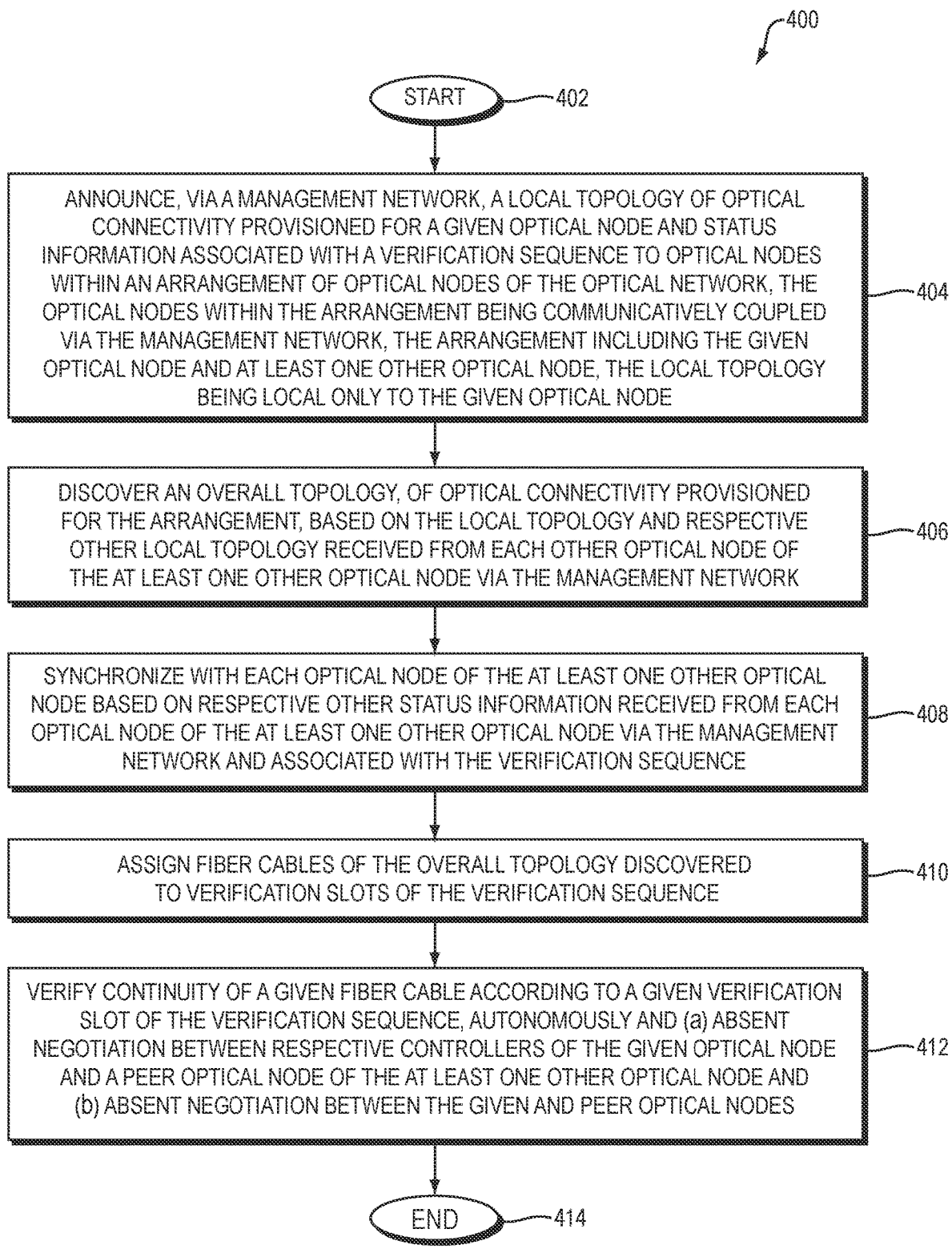
FIG. 4 is a flow diagram of an example embodiment of a method for performing topology discovery and negotiation-less optical fiber continuity verification in an optical network.

FIG. 4 is a flow diagram 400 of an example embodiment of a method for performing topology discovery and negotiation-less optical fiber continuity verification in an optical network, such as the optical network 100 of FIG. 1, disclosed above. The method begins (402) and announces, via a management network, a local topology of optical connectivity provisioned for a given optical node and status information associated with a verification sequence to optical nodes within an arrangement of optical nodes of the optical network, the optical nodes within the arrangement being communicatively coupled via the management network, the arrangement including the given optical node and at least one other optical node, the local topology being local only to the given optical node (404). The method discovers an overall topology, of optical connectivity provisioned for the arrangement, based on the local topology and respective other local topology received from each other optical node of the at least one other optical node via the management network, each respective other local topology being local only to a respective other optical node of the at least one other optical node (406). The method synchronizes with each optical node of the at least one other optical node based on respective other status information received from each optical node of the at least one other optical node via the management network and associated with the verification sequence (408). The method assigns fiber cables of the overall topology discovered to verification slots of the verification sequence, the assigning based on a verification sequencing method, the verification sequencing method being a same verification sequencing method employed at each optical node within the arrangement (410). The method verifies continuity of a given fiber cable according to a given verification slot of the verification sequence, autonomously and (a) absent negotiation between respective controllers of the given optical node and a peer optical node of the at least one other optical node and (b) absent negotiation between the given and peer optical nodes, the given fiber cable (i) coupled, in the overall topology, to a given optical port of the at least one optical port and to a peer optical port of the peer optical node and (ii) assigned to the given verification slot based on the verification sequencing method (412), and the method thereafter ends (414) in the example embodiment.

Figure 5:
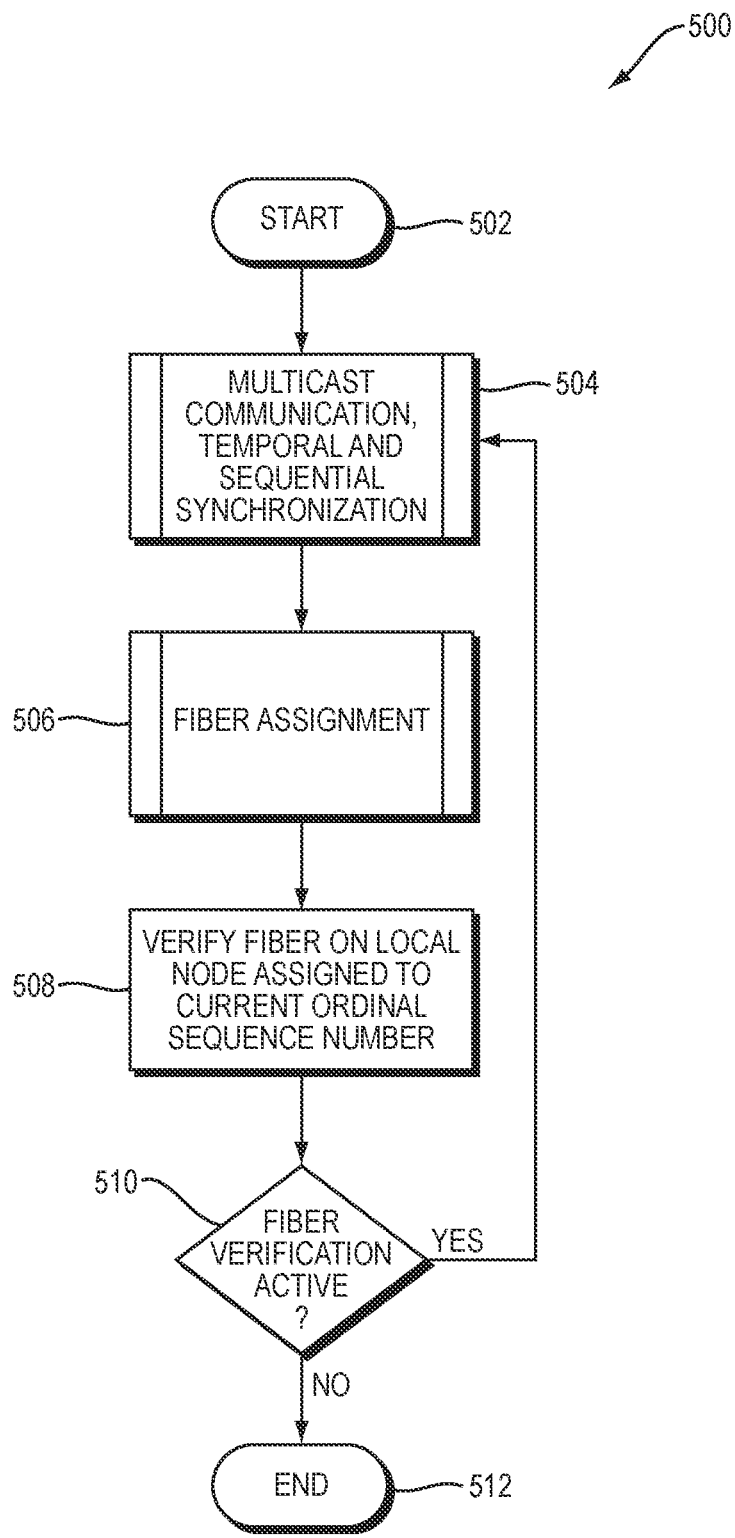
FIG. 5 is a flow diagram of another example embodiment of a method for performing topology discovery and negotiation-less optical fiber continuity verification in an optical network.

FIG. 5 is a flow diagram 500 of another example embodiment of a method for performing topology discovery and negotiation-less optical fiber continuity verification in an optical network. The method begins (502) and synchronizes, temporally and sequentially, execution of fiber continuity verification with other nodes in the optical network that are executing fiber continuity verification relative to a verification sequence (504), assigns fiber in an overall topology of the optical network to the current (i.e., present) verification slot in a sequence of verification slots of the verification sequence by assigning the fiber a respective ordinal number corresponding to a respective verification slot of the verification slots (506), verifies fiber at a local node that is assigned a given ordinal number that corresponds to a present verification slot of the verification, the present verification slot transitioned to in the execution (508). The method checks for whether fiber verification is still active (510) and, if so, returns to (504). If, however, fiber verification is no longer active, the method thereafter ends (512) in the example embodiment.

Figure 6A:
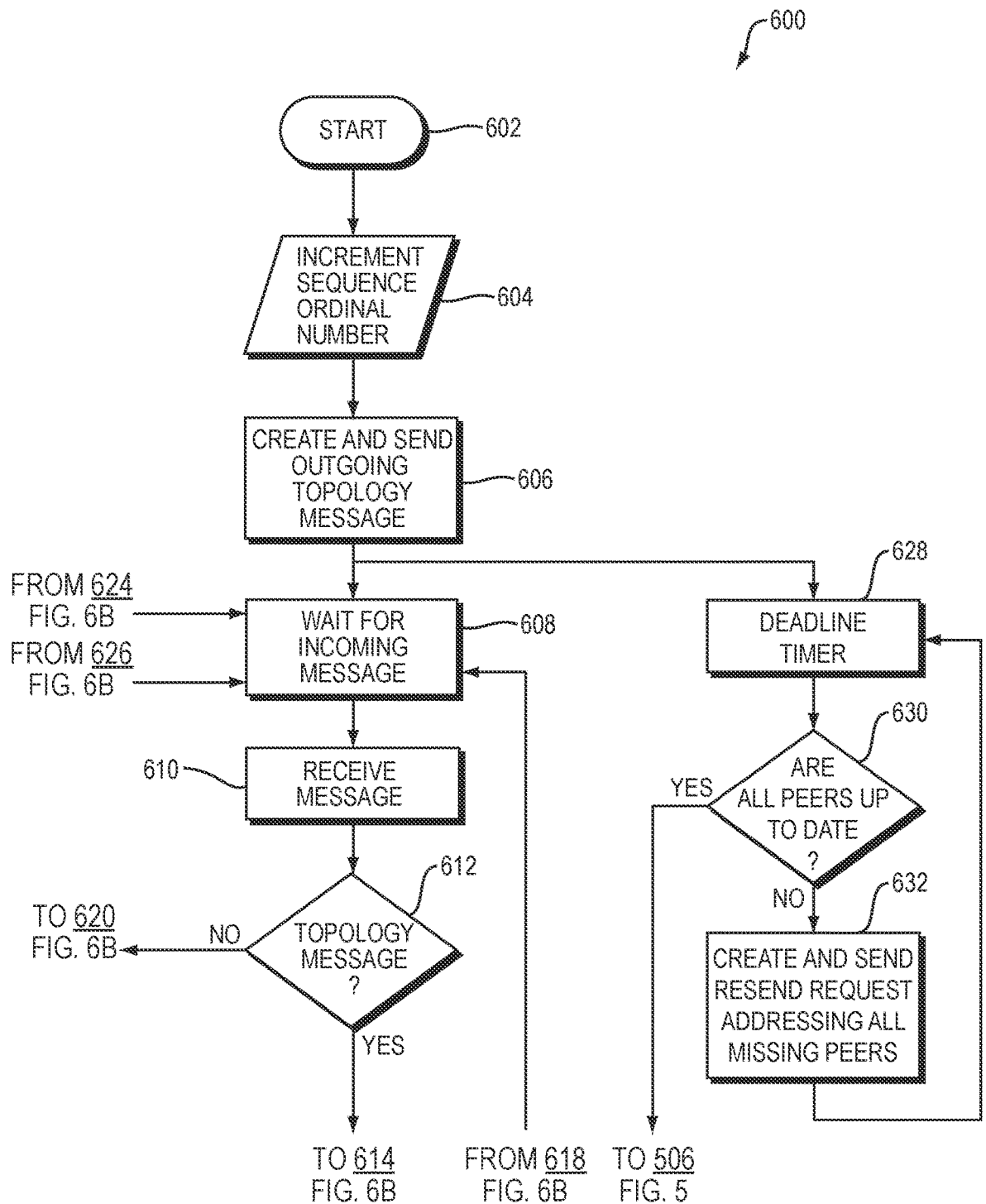
FIG. 6A is a flow diagram of an example embodiment of the inner workings of the method of FIG. 5.

FIG. 6A is a flow diagram 600 of an example embodiment of the inner workings of (504) of the method of FIG. 5, disclosed above. The optical node implementing the example embodiment may be referred to as local node within a context of FIGS. 6A and 6B.

Figure 6B:
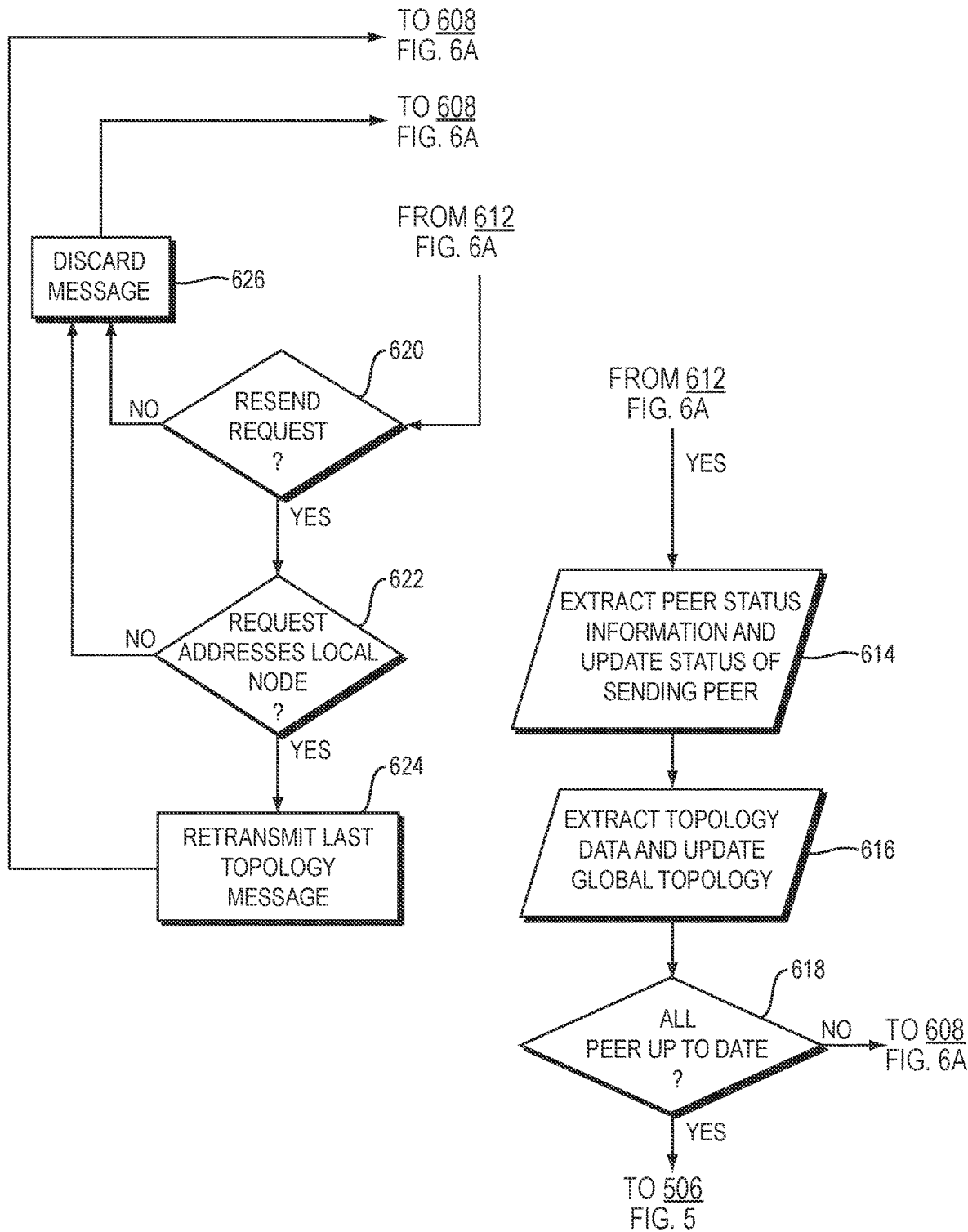
FIG. 6B is a continuation of the flow diagram of FIG. 6A.

FIG. 6B is a continuation of the flow diagram of FIG. 6A.

Referring to FIGS. 6A and 6B, the method begins (600) and increments the verification sequence number corresponding to a present verification slot of a verification sequence (604) and creates and sends an outgoing topology message that includes the local topology and the present verification slot (606). The method waits for incoming messages (608). If an incoming message is received (610), the method checks for whether the message is a topology message (612). If yes, the method extracts peer status information from the message and updates the status of the sending peer (614). The method extracts topology data and updates the overall topology (616). The method checks for whether all peers are up to date (618). If yes, the method thereafter proceeds to (506) of FIG. 5, disclosed above, as (504) has completed. If, however, at (618) it is determined that there is at least one peer that is not up to date, the method returns to wait for an incoming message (608).

If at (612), it is determined that the message is not a topology message, the method checks for the whether the message is a resend request (620). The resend request may be determined by extracting a value for a message type ID from a message type ID field of the message. The value may be compared to the defined message type ID value for the resend type message. The defined message type ID value may different from, for example, another value that is used to identify a message that includes local topology and status information. The resend message may include a single or list of unique node IDs to which the resend message is intended as well as a sequence number of a given verification slot of the verification sequence.

If it is determined that the message is not a resend request, the method discards the message as having an unknown message type (626) and returns to wait for an incoming message (608). If it is determined, however, that the message is a resend request, the method checks for whether the resend requests addresses the local node (622). If no, the method discards the message (626) and returns to wait for an incoming message (608). If it is determined, however, that the resend request does address the local node, the method retransmits a last topology message sent (624) and returns to wait for further incoming messages (608).

Referring back to the creating and sending of the outgoing topology message at (606), the method further starts a deadline timer (628) in addition to waiting for an incoming message (608). Following the expiration of the deadline timer (628), the method checks if all peers are up to date (630). If not, the method creates and sends a resend request addressing all missing peers (632) and the method thereafter proceeds to (506) of FIG. 5, disclosed above, as (504) has completed.

Figure 7A:
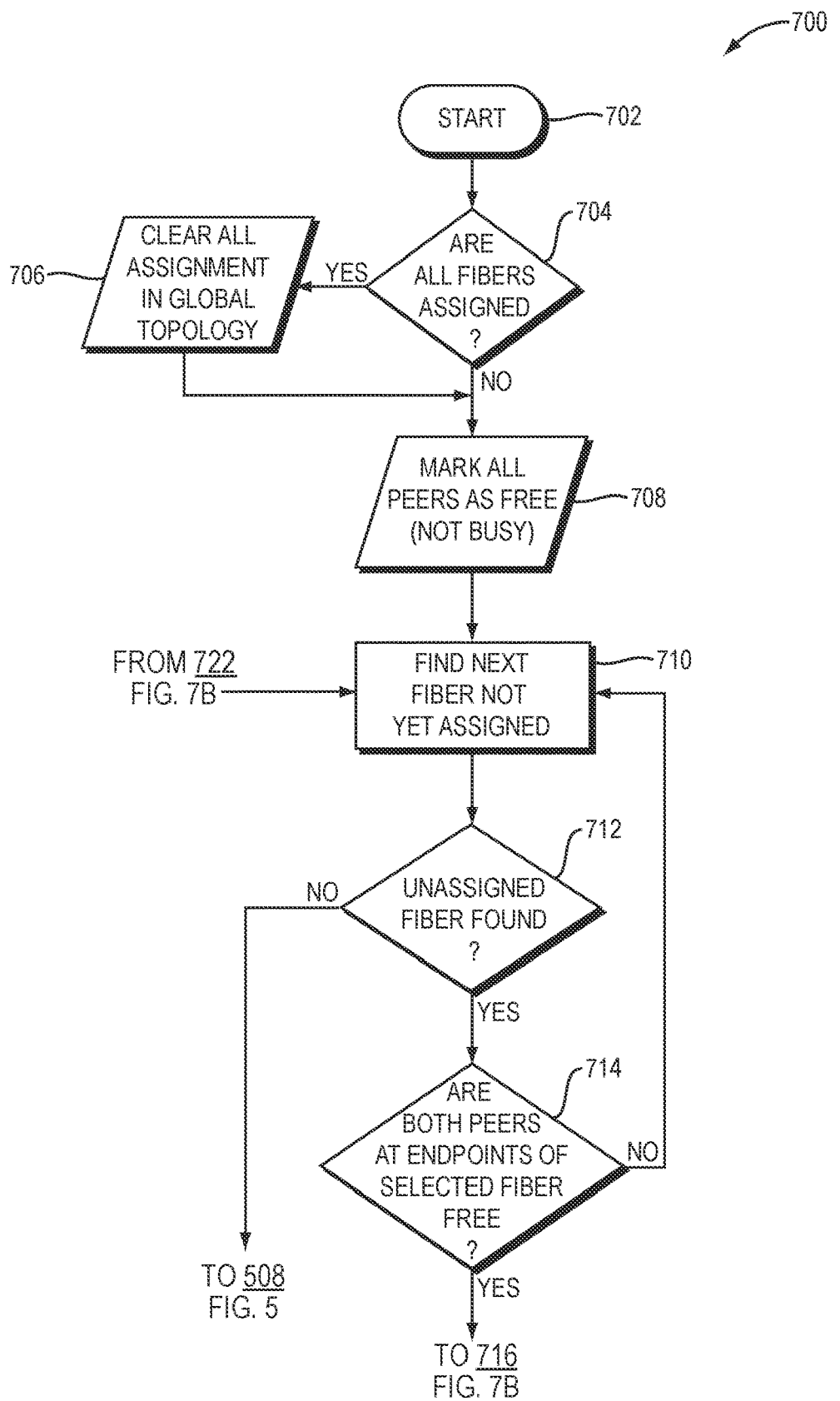
FIG. 7A is another flow diagram of an example embodiment of the inner workings of the method of FIG. 5.

FIG. 7A is a flow diagram 700 of an example embodiment of the inner workings of (506) of the method of FIG. 5, disclosed above.

Figure 7B:
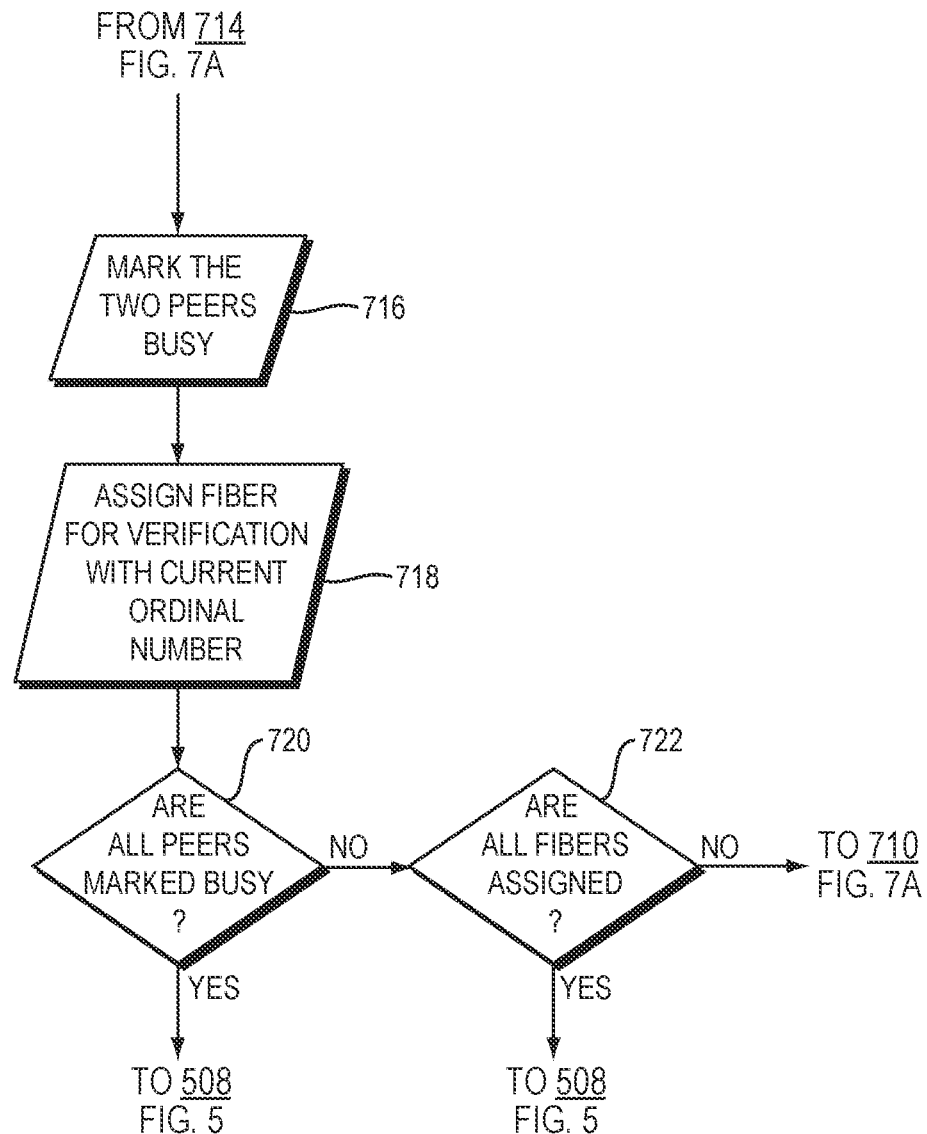
FIG. 7B is a continuation of the flow diagram of FIG. 7A.

FIG. 7B is a continuation of the flow diagram of FIG. 7A.

Referring to FIGS. 7A and 7B, the method begins (702) and checks if all fibers in the overall topology have been assigned (704). If yes, the method clears all assignments between fibers in the overall topology and verification slots in a verification sequence (706) and marks all peers as free (e.g., not busy) (708). This corresponds to the initialization of a new sequence, starting with verification slot 1 of the verification sequence. If at (704) it is determined that not all fibers have been assigned, the method marks all peers as free (e.g., not busy) (708).

Following the marking of all peers as free (e.g., not busy) (708), the method finds a next fiber that has not yet been assigned (710) and checks for whether an unassigned fiber has been found (712). If an unassigned fiber has not been found, the method thereafter proceeds to (508) as (506) has completed in the example embodiment. If, however, an unassigned fiber has been found, the method checks for whether both peers at endpoints of the selected fiber, that this, the unassigned fiber found, are free, that is, not presently verifying a fiber, (714) and the method marks the two peers as busy (716).

The method proceeds to assign the fiber for verification to a present ordinal number corresponding to the current (i.e., present) verification slot in the verification sequence (718). The method then checks if all peers are marked as busy (720). If yes, the method thereafter proceeds to (508) as (506) has completed in the example embodiment. If, however, all peers are not determined to be busy at (720), the method checks for whether all fibers are assigned (722). If yes, the method thereafter proceeds to (508) as (506) has completed in the example embodiment. If no, the method proceeds to find a next fiber that is not yet assigned (710) and the method proceeds, as disclosed above.

An example embodiment of a method may include discovering and monitoring presence of physical fiber connections between different optical nodes in a system. Such a method enables discovery and automatic provisioning of new fiber connections, monitoring and alarming of known (i.e., provisioned) fiber connections, and measurement and reporting of the end-to-end transmission loss of monitored fibers. Such a method may be based on heartbeat and topology discovery mechanism with associated communication protocol. The method has the advantage of guaranteeing temporal and sequential synchronization of optical cable verification frame transmission and reception between different optical cards. This is achieved by providing the following main functionalities:

Announcement of the partial topology locally visible to each optical node (direct neighbors according to provisioning data).

Acquisition and maintenance of the global system wide topology by receiving and interpreting the announcement from each optical node coupled to a management network.

Temporal synchronization of continuity verification transmission and reception by means of heart-beat (barriers) that cause the processor to wait on messages.

Sequential synchronization of continuity verification transmission and reception by means of heart-beat (sequence numbers).

Based on discovering a consistent view of the overall topology and based on the temporal and sequential synchronization, each node is able to control cable verification transition and reception, with no need for additional communication and handshaking. Based on a value of the sequence number (e.g., included in status information) each node can independently determine what fiber a given cycle is used to verify and what port it needs to select in order to perform continuity verification of the fiber determined. Based on the synchronization provided by the heartbeat mechanism and based on the overall topology discovered, the sequencing method determines what port-pairs (fiber connections) are to be selected for signaling for every verification slot (e.g., time slot) of a verification sequence.

Heart-Beat and Sequencing

According to an example embodiment, temporal and sequential synchronization between peers is achieved using a global barrier method as follows:

Each node keeps a track of all known partner nodes (peers), including: node ID, verification slot sequence number, and peer status. At the end of each verification slot (e.g., time slot) a peer sends message announcing readiness to pass to the next verification slot. The Node waits (barrier) until every peer has reported readiness. Once all peers have reported readiness the barrier can be crossed. There is no need to alert peers: they will know equally that all peers are ready. If some peer falls behind due to lost messages, it eventual issues a resend request, and can follow. Other peers will be waiting at the next barrier. After passing the barrier, the node initiates a next verification slot message. According to an example embodiment, an optimization may not wait for all of the nodes to report readiness before transitioning to a next verification slot in the verification sequence. For example, nodes that are not coupled by a fiber that is assigned to the present slot do not need to be waited on as they are not involved in the present verification slot that is being processed. Further, the only nodes that need to be waited on for a heartbeat message are those nodes that are involved in the current (i.e., present) verification slot verifying a fiber cable that is directly connected to the local node that is verifying the fiber cable.

According to an example embodiment, a method for continuity verification may implement a dual cycle mechanism. On an odd cycle: the node may prepare execution of step (port selection and Rx Tx configuration) and on an even cycle: execute step (transmission window).

According to example embodiments disclosed herein, peers will listen on the network and will adjust their current sequence number to the highest observed sequence number. If any node falls behind more than one verification slot, it needs to skip forward to the present verification slot. This guarantees that a node the that has fallen behind will not wait forever for messages that the other node can no longer send because it is already ahead. It also guarantees that a newly commissioned node is able to synchronize to the already existing heartbeat, that is, the present verification slot of the verification sequence.

Based on the provisioning data, peers are made aware of their local topology (i.e., fiber connections to direct neighbor peers). Using this information, and leveraging the heart-beat messages for communication, disclosed above, the peers work in synergy such that each can acquire the overall topology. Each peer adds additional information to the heart-beat message, announcing their local topology. Peers extract topology information from each other's heart-beat message, and join this information into the overall topology. By using the heart-beat messages (delivery and integrity guaranteed) an example embodiment ensures that each peer has the exact same view of the topology at the beginning of each verification slot. According to an example embodiment, local topology is based on provisioning. The heart beat wait message indicates the sender's readiness to enter the next verification slot. In addition, it may be used to convey the sender's local topology information.

According to an example embodiment, a resend request message may be sent by a peer if it remains in a wait state for longer than a defined time. The peer or list of peers being waited for are identified in the message. A peer receiving a resend request, responds with the last wait request it had sent out. If the receiver of this message already has crossed the next barrier it may not answer the request. The waiting peer will receive wait messages for the cycle after, and will know that it lost a cycle and needs to skip forward, that is, update its present verification slot by setting it to a highest received sequence number.

FIG. 8 is a block diagram of an example of the internal structure of a computer 800 in which various embodiments of the present disclosure may be implemented. The computer 800 contains a system bus 802, where a bus is a set of hardware lines used for data transfer among the optical nodes of a computer or processing system. The system bus 802 is essentially a shared conduit that connects different elements of a computer system (e.g., processor, disk storage, memory, input/output ports, network ports, etc.) that enables the transfer of information between the elements. Coupled to the system bus 802 is an I/O interface 804 for connecting various input and output optical nodes (e.g., keyboard, mouse, displays, printers, speakers, etc.) to the computer 800. A network interface 806 allows the computer 800 to connect to various other optical nodes attached to a network. The network interface 806 may include a transmitter multiplexer (not shown) and receiver multiplexer (not shown) to switch coupling between a transmitter (not shown) an receiver (not shown) an respective optical ports (not shown), respectively. Memory 808 provides volatile or non-volatile storage for computer software instructions 810 and data 812 that may be used to implement an example embodiment of the present disclosure, where the volatile and non-volatile memories are examples of non-transitory media. Disk storage 814 provides non-volatile storage for computer software instructions 810 and data 812 that may be used to implement embodiments of the present disclosure. A central processor unit 818 is also coupled to the system bus 802 and provides for the execution of computer instructions. The computer software instructions 810 may cause the central processor unit 818 to implement methods disclosed herein and the data 812 may include, for example a local topology provisioned for a optical node and an overall topology discovered for an optical network, such as the optical network 100 disclosed above.

Further example embodiments disclosed herein may be configured using a computer program product; for example, controls may be programmed in software for implementing example embodiments. Further example embodiments may include a non-transitory computer-readable medium containing instructions that may be executed by a processor, and, when loaded and executed, cause the processor to complete methods described herein. It should be understood that elements of the block and flow diagrams may be implemented in software or hardware, such as via one or more arrangements of circuitry of FIG. 8, disclosed above, or equivalents thereof, firmware, a combination thereof, or other similar implementation determined in the future.

In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein.

While example embodiments have been particularly shown and described, it will be understood by those skilled in the art that various changes in form and details may be made therein without departing from the scope of the embodiments encompassed by the appended claims.

What is claimed is:

1. An optical network comprising:
   a first optical node; and
   a second optical node, the first and second optical nodes performing synchronized continuity verification of a fiber cable autonomously and absent negotiation, a) between respective controllers of the first and second optical nodes and b) between the first and second optical nodes, by verifying the fiber cable according to a verification slot of a verification sequence, the fiber cable assigned to the verification slot of the verification sequence.

2. The optical network of claim 1, wherein the fiber cable is a given fiber cable, wherein the verification slot is a given verification slot, and wherein the optical network further comprises:
   an arrangement of at least two optical nodes, the at least two optical nodes including the first and second optical nodes, the first optical node associated with a first local topology of optical connectivity provisioned for the first optical node, the second optical node associated with a second local topology of optical connectivity provisioned for the second optical node; and
   a management network, optical nodes within the arrangement being communicatively coupled to each other via the management network, the first and second optical nodes:
   announcing, via the management network, the first and second local topologies, respectively, and respective status information associated with the verification sequence;
   discovering an overall topology of optical connectivity provisioned for the arrangement based on the first and second local topologies;
   synchronizing to each other based on the announcing;
   assigning fiber cables of the overall topology discovered to verification slots of the verification sequence, the assigning based on a verification sequencing method, the verification sequence method being a same verification sequencing method employed at each optical node within the arrangement, the given fiber cable coupling optical ports of the first and second optical nodes in the overall topology, the given fiber cable assigned to the given verification slot of the verification sequence based on the verification sequencing method.

3. An optical node comprising:
   a processor, the processor configured to:
   perform synchronized continuity verification of a fiber cable with a peer optical node, autonomously and absent negotiation, a) between respective controllers of the optical node and peer optical node and b) between the optical node and peer optical nodes, by verifying the fiber cable according to a verification slot of a verification sequence,
   the fiber cable assigned to the verification slot of the verification sequence.

4. The optical node of claim 3, wherein the optical node is in an optical network, wherein the fiber cable is a given fiber cable, wherein the verification slot is a given verification slot, and wherein the optical node further comprises:
   at least one optical port configured to transmit, receive, or transmit and receive, payload data; and
   a management port coupled to a management network, optical nodes within an arrangement of optical nodes of the optical network being communicatively coupled to each other via the management network, the arrangement including the optical node and at least one other optical node, the processor further configured to:
   announce a local topology of optical connectivity provisioned for the optical node and status information associated with the verification sequence to the optical nodes within the arrangement via the management port, the local topology and status information being local only to the optical node;
   discover an overall topology, of optical connectivity provisioned for the arrangement, based on the local topology and respective other local topology received from each other optical node of the at least one other optical node via the management port, each respective other local topology being local only to a respective other optical node of the at least one other optical node;
   synchronize with each optical node of the at least one other optical node based on respective other status information received from each optical node of the at least one other optical node via the management port, the respective other status information associated with the verification sequence;
   assign fiber cables of the overall topology discovered to verification slots of the verification sequence based on a verification sequencing method, the verification sequencing method being a same verification sequencing method employed at each optical node within the arrangement, the given fiber cable (i) coupled, in the overall topology, to a given optical port of the at least one optical port and to a peer optical port of the peer optical node and (ii) assigned by the processor to the given verification slot based on the verification sequencing method.

5. The optical node of claim 4, wherein the optical node is associated with a given controller of the respective controllers and wherein the processor is further configured to discover the overall topology by supplementing the local topology with the other local topology, the local topology received from the given controller via the management port, each respective other local topology received via a respective announcement message communicated over the management network by each respective other optical node.

6. The optical node of claim 4, wherein the local topology includes optical connectivity provisioning information for each optical port of the at least one optical port that is provisioned to be coupled to a respective peer optical port via a respective fiber cable in the optical network.

7. The optical node of claim 4, wherein the processor is further configured to announce the local topology, status information, or a combination thereof in a message transmitted via the management port to the optical nodes in the arrangement, wherein the status information includes a sequence number, and wherein the processor is further configured to:
   include a message type identifier (ID) and unique ID of the optical node in the message, the message type ID identifying a type of the message, the sequence number identifying a present verification slot of the verification slots of the verification sequence to which the processor is synchronized;
   compute a checksum for the message; and
   append the checksum computed to the message.

8. The optical node of claim 4, wherein the processor is further configured to:
compute a first checksum for a message received via the management port, the message including a message type ID and unique ID of a sending optical node of the message and having a second checksum appended thereto; and
in an event the first checksum computed does not match the second checksum, discard the message received.

9. The optical node of claim 4, wherein the processor is further configured to verify continuity of the given fiber cable according to the given verification slot of the verification sequence and synchronized with the peer optical node, wherein the peer optical node includes the peer optical port.

10. The optical node of claim 4, wherein the verification sequencing method assigns each fiber cable of the overall topology, deterministically, to a respective verification slot in the verification sequence and wherein the optical node and each other optical node arrive at a same fiber-to-verification slot mapping for each fiber cable by employing the same verification sequencing method.

11. The optical node of claim 4, wherein the optical node further comprises a transmitter, receiver, or a combination thereof, a transmitter multiplexer, receiver multiplexer, or a combination thereof, and wherein the processor is further configured to:
progress through the verification sequence by transitioning between verification slots of the verification sequence based on received status information associated with the verification sequence, the received status information transmitted by each optical node of the at least one other optical node via the management network and received by the processor via the management port; and
in an event the processor transitions to the given verification slot, couple the given optical port to the transmitter, receiver, or combination thereof via the transmitter multiplexer, receiver multiplexer, or combination thereof, and verify continuity of the given fiber cable assigned to the given verification slot.

12. A method comprising:
performing, by an optical node, synchronized continuity verification of a fiber cable with a peer optical node, autonomously and absent negotiation, a) between respective controllers of the optical node and peer optical node and b) between the optical node and peer optical node, by verifying the fiber cable according to a verification slot of a verification sequence,
the fiber cable assigned to the verification slot of the verification sequence.

13. The method of claim 12, wherein the optical node is a given optical node, wherein the fiber cable is a given fiber cable, wherein the verification slot is given verification slot, and wherein the method further comprises:
announcing, via a management network, a local topology of optical connectivity provisioned for the given optical node and status information associated with a verification sequence to optical nodes within an arrangement of optical nodes of an optical network, the optical nodes within the arrangement being communicatively coupled via the management network, the arrangement including the given optical node and at least one other optical node in the optical network, the at least one other optical node including the peer node, the local topology being local only to the given optical node;
discovering an overall topology, of optical connectivity provisioned for the arrangement, based on the local topology and respective other local topology received from each other optical node of the at least one other optical node via the management network, each respective other local topology being local only to a respective other optical node of the at least one other optical node;
synchronizing with each optical node of the at least one other optical node based on respective other status information received from each optical node of the at least one other optical node via the management network and associated with the verification sequence;
assigning fiber cables of the overall topology discovered to verification slots of the verification sequence, the assigning based on a verification sequencing method, the verification sequencing method being a same verification sequencing method employed at each optical node within the arrangement, the given fiber cable (i) coupled, in the overall topology, to a given optical port of the at least one optical port and to a peer optical port of the peer optical node and (ii) assigned to the given verification slot based on the verification sequencing method.

14. The method of claim 13, wherein the discovering includes supplementing the local topology with the other local topology, the local topology received from a given controller of the respective controllers, each respective other local topology received via a respective announcement message communicated over the management network by each respective other optical node.

15. The method of claim 14, wherein the local topology includes optical connectivity provisioning information for each optical port of the at least one optical port that is provisioned to be coupled to a respective peer optical port via a respective fiber cable in the optical network.

16. The method of claim 14, wherein the announcing includes transmitting the local topology, status information, or a combination thereof in a message transmitted via the management network to the optical nodes in the arrangement, wherein the status information includes a sequence number, and wherein the method further comprises:
including a message type identifier (ID) and unique ID of the optical node in the message, the message type ID identifying a type of the message, the sequence number identifying a present verification slot of the verification slots of the verification sequence to which the given optical node is synchronized;
computing a checksum for the message; and
appending the checksum computed to the message.

17. The method of claim 14, further comprising:
computing a first checksum for a message received via the management port, the message including a message type ID and unique ID of a sending optical node of the message and having a second checksum appended thereto; and
in an event the first checksum computed does not match the second checksum, discarding the message received.

18. The method of claim 14, wherein the verifying includes verifying continuity of the given fiber cable synchronized with the peer node according to the given verification slot of the verification sequence, wherein the verification sequencing method assigns each fiber cable of the overall topology, deterministically, to a respective verification slot in the verification sequence, and wherein the given optical node and each other optical node arrive at a same fiber-to-verification slot mapping for each fiber cable by employing the same verification sequencing method.

19. The method of claim 14, further comprising:
progressing through the verification sequence by transitioning between verification slots of the verification sequence based on received status information associated with the verification sequence, the received status information transmitted by each optical node of the at least one other optical node via the management network; and in an event the progressing transitions to the given verification slot, coupling the given optical port to a transmitter or receiver and verifying continuity of the given fiber cable assigned to the given verification slot.

20. A non-transitory computer-readable medium having encoded thereon a sequence of instructions which, when loaded and executed by a processor of a first optical node, causes the processor to:
perform synchronized continuity verification of a fiber cable with a second optical node, autonomously and absent negotiation, a) between respective controllers of the first and second optical nodes and b) between the first and second optical nodes, by verifying the fiber cable according to a verification slot of a verification sequence, the fiber cable assigned to the verification slot of the verification sequence.

* * * * *